2,953,516

HYDROCRACKING OF HYDROCARBON OIL WITH A COPPER OXIDE-CHROMIUM OXIDE CATALYST ON AN ALUMINA-FLUORINE SUPPORT

Lloyd E. Gardner, Bartlesville, Okla., assignor to Phillips Petroleum Company, a corporation of Delaware No Drawing. Filed Dec. 2, 1957, Ser. No. 699,929

5 Claims. (Cl. 208—112)

This invention relates to an improved hydrocarbon conversion catalyst. In one specific aspect, the invention is concerned with a copper-chromia-alumina catalyst containing small proportions of fluorine. In another aspect, the invention is concerned with a method of hydrocracking heavy oils.

A number of catalysts have been developed for hydrocracking heavy oils to more valuable, lower boiling products. Catalysts of the prior art, however, when employed to hydrocrack heavy oils produce undesirably large quantities of materials boiling lower than gasoline and of gasoline boiling range materials of poor quality. In the state of the refining art today the most desirable products of hydrocracking of heavy oils are the gas oils boiling in the 500 to 850° range. This is because these gas oils can then be catalytically cracked by well developed techniques to produce high yields of gasoline of excellent quality. I have developed a catalyst which produces high yields of gas oils boiling in the range from 500 to 850° F. when employed in the hydrocracking of heavy oils.

It is an object of my invention to provide an improved catalyst. A further object is to provide an improved process for the conversion of hydrocarbons to more valuable fluid hydrocarbons. Another object is to provide an improved hydrocracking catalyst with high selectivity for production of gas oils from heavy oils boiling in the range above 850° F. It is also an object of the invention to provide an improved process for hydrocracking heavy oils. Other objects, as well as aspects and advantages, of the invention will become apparent from a consideration of the accompanying disclosure.

The catalyst of the invention comprises copper and chromium, both in the form of oxides, deposited on an alumina base containing a small proportion of fluorine. The amount of fluorine in the alumina base is usually from 0.1 to 2 weight percent of the alumina base, preferably from 0.5 to 1.0 weight percent. The copper oxide and chromium oxide may be in the form of a mixture of oxides of copper and oxides of chromium or a complex oxide of copper and chromium, such as $CuCr_2O_4$ or $CuCr_2O_7$, either alone or in admixture with an oxide of copper or an oxide of chromium. I am not restricted as to the exact form of the oxides, nor have I been able to determine the exact form of the oxides in any particular catalyst of the invention. In any case, my catalyst comprises a mixture of copper and chromium in an oxidized form, wherein the ratio of chromium to copper therein is from 1 to 1 to 4 to 1 parts by weight deposited on alumina containing from 0.1 to 2 weight percent fluorine, the total weight percent of copper plus chromium contained in said catalyst being in the range from 2 to 20 weight percent. Also, when the catalyst is employed to convert a sulfur containing feed some of the copper probably becomes converted to a sulfide.

While any alumina having a high surface area of at least 50 square meters/gm., usually 50 to 250 square meters/gm., can be employed, I have found gamma alumina to be especially suitable.

The fluorine-containing alumina can be prepared, for instance, by treating the alumina with hydrogen fluoride or other fluorides, such as ammonium fluoride. When using HF aqueous HF is preferred, although treatment can be effected with gaseous HF. Treatment is effected until there is 0.1 to 2 weight percent fluorine bound in the catalyst base. The alumina is dried to remove water and any free fluorine compounds.

One method for preparing the catalyst is by impregnating the fluorine-containing alumina base with a solution of a copper salt, such as copper nitrate, drying the impregnated phase, then impregnating the base with a solution of a chromium salt, such as ammonium dichromate and again drying the impregnated base and then calcining for a period of time at a temperature, for instance, of from about 675 to about 750° F. in order to decompose the salts, leaving oxides. In another method pills of the fluorine-alumina base can be impregnated with a single solution of a salt of each of copper and chromium, then drying and then calcined as before.

The catalyst of the invention is particularly useful for the hydrocracking, that is, the destructive hydrogenation in the presence of added hydrogen, of heavy residuum, crude petroleum, topped crude, and tars or heavy fractions of petroleum. More specifically, the catalyst is useful in the hydrocracking of hydrocarbon oil boiling above 850° F. The heavy oils can have present therein, and usually do, other hydrocarbons boiling lower than 850° F., although the feeds are usually topped to remove at least the materials boiling up to 400° F. The range of operating conditions for hydrocracking with my catalyst employing such feeds are:

|  | Broad | Preferred |
|---|---|---|
| Temperature, °F | 700–1,000 | 800–900 |
| Pressure, p.s.i.g. | 500–5,000 | 1,000–2,000 |
| LHSV [1] | 0.1–10 | 0.5–2.0 |
| Hydrogen, s.c.f./bbl | 1,000–10,000 | 2,000–6,000 |

[1] Liquid hourly space velocity.

The heavy hydrocarbon feeds to such hydrocracking operations usually contain sulfur; amounts up to about 4 weight percent are usually present, some cases higher percentages of sulfur are present.

After use of the catalyst for a period of time coke will build up thereon and is suitably regenerated by burning it off, as will be understood. Regeneration temperatures are suitably in the range from 850 to 1100° F.

When employing the catalyst of the invention in the hydrocracking reaction it is usually preferred to limit the conversion of the material contained in the feed which boils over 850° F. to lower boiling materials to a maximum of about 80 percent; higher conversions, such as about 90 percent are possible, but conversions in this high range are usually less economical since the catalyst must be regenerated much more often because of the faster rate of carbon build up.

The following specific examples show the advantages of the catalyst of the present invention, but are not to be taken as limiting the catalyst or process of the invention.

Fixed beds of various catalysts in the form of 1/8" diameter and 1/8" high pills were employed to hydrocrack 400° F. + topped Wafra crude containing 55 weight percent of material boiling over 850° F., 33.9 weight percent boiling in the range from 500–850° F., and 3.6 weight percent sulfur. Operating conditions were 1000 p.s.i.g., 1 LHSV, 800–875° F., and 2000 cubic feet hydrogen per barrel of oil. The results are shown in Table I.

Table I

|  | Percent Conversion of material boiling over 850° F. | Yields, Wt. percent of Chg. | | | |
|---|---|---|---|---|---|
|  |  | $C_1$–$C_4$ | $C_5$–400° F. | 400–500° F. | 500–850° F. |
| 1. CuO—$Cr_2O_3$ on F—$Al_2O_3$ | 72 | 6.8 | 9.0 | 9.1 | 57.3 |
| 2. CuO—$Cr_2O_3$—ZnO | 72 | 8.7 | 11.5 | 13.1 | 48.2 |
| 3. $V_2O_5$—$Ag_2O$—$Al_2O_3$ | 75 | 12.3 | 12.7 | 11.9 | 47.1 |
| 4. $WS_2$ | 71 | 7.4 | 10.8 | 15.9 | 48.9 |
| 5. NiO—$MoO_3$—$Al_2O_3$ | 74 | 4.5 | 13.5 | 16.6 | 46.8 |
| 6. $MoO_3$—$Al_2O_3$ | 72 | 8.9 | 13.0 | 17.5 | 44.0 |
| 7. CoO—$MoO_3$—$Al_2O_3$ | 72 | 8.5 | 13.4 | 14.9 | 47.1 |
| 8. CoO—$MoO_3$—$Rh_2O_3$—$Al_2O_3$ | 72 | 7.1 | 12.6 | 13.9 | 46.9 |
| 9. CoO—$MoO_3$—4A Sieve | 74 | 11.5 | 14.4 | 14.8 | 42.5 |
| 10. CoO—$MoO_3$—$SiO_2$—$Al_2O_3$ | 72 | 13.5 | 11.3 | 11.3 | 47.2 |

Catalyst No. 1 of this invention was prepared as follows: $Al(NO_3)_3 \cdot 9H_2O$ (3640 g.) was dissolved in distilled $H_2O$ (28 liters). Two liters of 59% $NH_4OH$ was added over a one hour period to precipitate the $Al(OH)_3$ gel. The gel was filtered and washed in 5 separate washings with distilled water and was suspended in the water each time: 19 g. of 47 percent HF was diluted in 200 ml. distilled water and added to the gel and thoroughly mixed. The gel was then dried at 200° F. for 44 hours. The resulting cake was broken into small pieces, placed in round bottom flasks, and heated to 700–725° F. This temperature was held for 5 hours, and then the fluorine-containing alumina was left overnight at 575–600 F.

About 10 weight percent of hydrogenated corn oil was added as a binder, and the catalyst base was ground to a powder in a hammermill. ⅛″ pills were made in a pilling machine. The corn oil was removed by heating the pills to 1000° F. in a slow stream of air. The heating at 1000° F. was carried out for 24 hours.

The fluorine-containing alumina pills were impregnated with a solution of cupric nitrate and then dried at 110 degrees C. The pills were then impregnated with a solution of ammonium dichromate, dried at 110 degrees C. for 30 hours and then heated slowly to 375 degrees C. and then heated at that temperature for 20 hours. The catalyst so prepared contained 1.8 weight percent copper, 2.8 weight percent chromium, and 0.25 weight percent fluorine. The gamma alumina used to prepare a catalyst base had a surface area of 113 square meters per gram.

Most of the catalysts are compared at 72 percent conversion. The conversion shown for catalysts 1, 3, 4, 5, 8, 9 and 10 are the actual conversions carried out in the runs, while the conversions shown for catalysts 2, 6, and 7 and the corresponding yield data were interprelated from curves of several other runs at different conversions on each catalyst. Catalyst Nos. 6, 7 and 10 are well known hydrocracking catalysts of the prior art. It will be seen from the foregoing examples that catalyst No. 1 of the invention gives a much more desirable product distribution, yielding 57.3 weight percent of the charge as gas oil boiling in the range from 500 to 850° F.

As will be evident to those skilled in the art, various modifications of this invention can be made or followed in the light of the foregoing disclosure and discussion without departing from the spirit or scope of the disclosure or from the scope of the claims.

I claim:

1. An improved catalyst comprising a mixture of copper and chromium in an oxidized form, wherein the ratio of chromium to copper therein is from 1:1 to 4:1 parts by weight deposited on alumina containing from 0.1 to 2 weight percent fluorine, the alumina having a surface area of at least 50 square meters per gram, the total weight percent of copper plus chromium contained in said catalyst being in the range from 2 to 20 weight percent.

2. A catalyst of claim 1 wherein said alumina has a surface area in the range from 50 to 250 square meters per gram.

3. A method of hydrocracking a hydrocarbon oil boiling above 850° F. which comprises charging a catalyst and a feed comprising said hydrocarbon to a contacting zone and contacting said feed with said catalyst at a temperature in the range from 700 to 1000 degrees F., a pressure in the range from 500 to 5000 p.s.i.g., a liquid hour space velocity of from 0.1 to 10, in the presence of from 1000 to 2000 standard cubic feet of hydrogen per barrel of said feed, said catalyst comprising a mixture of copper and chromium in an oxidized form, wherein the ratio of chromium to copper therein is from 1:1 to 4:1 parts by weight deposited on alumina containing from 0.1 to 2 weight percent fluorine, the total weight percent of copper plus chromium contained in said catalyst being in the range from 2 to 20 weight percent; thereby converting at least a portion of the material boiling above 850 degrees F. and obtaining good yields of gas-oils boiling in the range from 500 to 850 degrees F.

4. A method of hydrocracking a hydrocarbon oil boiling above 850° F. which comprises charging a catalyst and a feed comprising said hydrocarbon to a contacting zone and contacting said feed with said catalyst at a temperature in the range from 800 to 900 degrees F., a pressure in the range from 1000 to 2000 p.s.i.g., a liquid hour space velocity of from 0.5 to 2.0, in the presence of from 2000 to 6000 standard cubic feet of hydrogen per barrel of said feed, said catalyst comprising a mixture of copper and chromium in an oxidized form, wherein the ratio of chromium to copper therein is from 1:1 to 4:1 parts by weight deposited on alumina containing from 0.1 to 2 weight percent fluorine, the total weight percent of copper plus chromium contained in said catalyst being in the range from 2 to 20 weight percent; thereby converting at least a portion of the material boiling above 850 degrees F. and obtaining good yields of gas-oils boiling in the range from 500 to 850 degrees F.

5. A process of claim 4 wherein said feed contains sulfur.

References Cited in the file of this patent

UNITED STATES PATENTS

| 1,881,927 | Pott et al. | Oct. 11, 1932 |
| 2,194,186 | Pier et al. | Mar. 19, 1940 |
| 2,215,206 | Biggs et al. | Sept. 17, 1940 |
| 2,741,618 | Young | Apr. 10, 1956 |
| 2,760,907 | Attane et al. | Aug. 28, 1956 |
| 2,791,613 | Pray et al. | May 7, 1957 |
| 2,800,518 | Pitzer | July 23, 1957 |
| 2,825,743 | McLean et al. | Mar. 4, 1958 |